(12) United States Patent
Taoka

(10) Patent No.: US 8,934,028 B2
(45) Date of Patent: Jan. 13, 2015

(54) IMAGING APPARATUS AND IMAGE PROCESSING METHOD

(71) Applicant: Samsung Electronics Co., Ltd., Gyeonggi-do (KR)

(72) Inventor: Mineki Taoka, Kanagawa (JP)

(73) Assignee: Samsung Electronics Co., Ltd. (KR)

(*) Notice: Subject to any disclaimer, the term of this patent is extended or adjusted under 35 U.S.C. 154(b) by 175 days.

(21) Appl. No.: 13/715,195

(22) Filed: Dec. 14, 2012

(65) Prior Publication Data
US 2013/0155284 A1  Jun. 20, 2013

(30) Foreign Application Priority Data

Dec. 15, 2011  (JP) ................................. 2011-275010
Nov. 12, 2012  (KR) ........................ 10-2012-0127622

(51) Int. Cl.
*H04N 19/625* (2014.01)
*H04N 19/423* (2014.01)
*H04N 19/61* (2014.01)

(52) U.S. Cl.
CPC ... *H04N 19/00812* (2013.01); *H04N 19/00484* (2013.01); *H04N 19/00781* (2013.01)
USPC ................... 348/222.1; 348/231.99

(58) Field of Classification Search
USPC ........................................ 348/23.99, 222.11
See application file for complete search history.

(56) References Cited

U.S. PATENT DOCUMENTS

| 6,342,950 | B1* | 1/2002 | Tabata et al. | 358/1.6 |
|---|---|---|---|---|
| 7,598,985 | B2* | 10/2009 | Sasaki | 348/222.1 |
| 8,244,048 | B2* | 8/2012 | Sohn et al. | 382/238 |
| 8,411,976 | B2* | 4/2013 | Odagiri | 382/238 |
| 2008/0266415 | A1* | 10/2008 | Noh | 348/222.1 |
| 2009/0153677 | A1* | 6/2009 | Taoka | 348/208.1 |
| 2009/0193066 | A1* | 7/2009 | Sato et al. | 708/651 |
| 2010/0214306 | A1* | 8/2010 | Kim | 345/560 |
| 2011/0013854 | A1* | 1/2011 | Odagiri | 382/245 |

FOREIGN PATENT DOCUMENTS

JP   2007267349   10/2007

* cited by examiner

*Primary Examiner* — Roberto Velez
*Assistant Examiner* — Tuan Le
(74) *Attorney, Agent, or Firm* — The Farrell Law Firm, P.C.

(57) ABSTRACT

Disclosed is an imaging apparatus which performs efficient JPEG compression encoding by dividing an image after an image processing into a plurality of blocks and then performing JPEG compression, and also generates a natural compressed image. The imaging apparatus includes an image processor for generating image data from a light input into an imaging device, an encoder for encoding the image data to generate encoded image data, and a storage unit for storing the encoded image data.

5 Claims, 9 Drawing Sheets

IMAGING APPARATUS AND IMAGE PROCESSING METHOD

PRIORITY

This application claims priority under 35 U.S.C. §119(a) to a Japanese Patent Application filed in the Japanese Patent and Trademark Office on Dec. 15, 2011 and assigned Serial No. JP 2011-275010, and a Korean Patent Application filed in the Korean Intellectual Property Office on Nov. 12, 2012 and assigned Serial No. KR 10-2012-0127622, the entire content of each of which are incorporated herein by reference.

BACKGROUND OF THE INVENTION

1. Field of the Invention

The present invention relates generally to an imaging apparatus and an image processing method, and more particularly, to an imaging apparatus and processing method which perform JPEG compression encoding by dividing an image after an image processing into a plurality of blocks without an external memory, perform efficient JPEG compression encoding, and generate a natural compressed image.

2. Description of the Related Art

An image compression encoding in a JPEG mode processes one entire screen as one unit. On the other hand, one image is divided into a plurality of blocks in a vertical direction and the divided blocks are processed in order to save capacities of a line memory, within Large Scale Integration (LSI) installed in a digital still camera and the like. Accordingly, in order to process one entire image and then make the image be in a JPEG compressible state, it is required to stop processing for all blocks and record a result of the processing in an external memory such as an SDRAM to combine the blocks and the result of the processing.

Further, a JPEG compression encoder for JPEG compression reads an image configured in an external memory to execute compression encoding. To this end, JPEG compression in a digital still camera is performed through a process of recording one image in an external memory such as an SDRAM at all times and also reading the image from the corresponding external memory.

In many cases, speed capability of a conventional digital still camera is determined by speed capability of an imaging apparatus. Further, the speed capability of the digital still camera requires only a continuous shooting capability in a degree of three frames/shots to seven frames/shots per second. However, current imaging apparatuses have a high capability, and there is a trend of using a resolution of 12 to 20 megapixels or more. Further, currently, the speed capability requires a continuous shooting capability in a degree of 10 to 15 frames/shots per second, and a processing capability required for the digital still camera becomes much higher in comparison with the conventional camera.

Since the processing capability becomes higher as described above, the digital still camera repeatedly reads the image from the external memory or writes the image in the external memory every time for JPEG compression encoding of the image. Further, accordingly, power consumption increases, the number of external memories, which are installed to solve a problem of decrease in speed, increases according to the increase in the reading and writing, and a price of the digital still camera increases according to the increase in the number of external memories. Therefore, a need exists to execute the JPEG compression encoding of the image without performing the reading from and the writing in the external memory as much as possible.

Meanwhile, JPEG compression encoding is an encoding based on DCT, and has to be encoded only in the units of eight vertical pixels. In general, when the lowest part of the image does not completely include eight pixels, a method of encoding the lowest part by copying a final line or inserting a black line is used. However, when the lowest part is encoded by copying the final line or inserting the black line, a problem is created in that an image corresponding to the lowest part is not a natural image.

SUMMARY OF THE INVENTION

Accordingly, the present invention has been made to solve the above described problems, and an aspect of the present invention is to provide an imaging apparatus and processing method which perform JPEG compression encoding by dividing an image after an image processing into a plurality of blocks without an external memory, perform efficient JPEG compression encoding, and generate a natural compressed image.

In accordance with an aspect of the present invention, an imaging apparatus is provided. The imaging apparatus includes an image processor for generating image data from a light input into an imaging device; an encoder for encoding the image data to generate encoded image data; and a storage unit for storing the encoded image data, wherein the image processor horizontally divides the image data into a plurality of blocks and supplies the divided blocks to the encoder, and includes one or more filter units for performing a predetermined filter processing for the image data and a filter controller for controlling the filter processing of the filter unit, and wherein the filter controller acquires a number of vertical pixels of the image data, and controls the filter unit such that when the number of vertical pixels of the image data is indivisible by a number of vertical pixels corresponding to a preset encoding unit, data in a last row of the image data is copied and the copied data is added to the image data until the number of vertical pixels of the image data is divisible.

In accordance with another aspect of the present invention, an image processing method is provided. The image processing method includes performing image processing by generating image data from light input into an imaging device; encoding the image data to generate encoded image data; and storing the encoded image data, wherein when the image data is horizontally divided into a plurality of blocks during image processing, the image data is encoded without passing through storing the encoded image data, and wherein performing the image processing includes performing one or more filter processing by performing a predetermined filter processing for the image data and performing a filter control by controlling the filter processing in performing the one or more filter processing, and performing the filter control includes calculating a number of vertical pixels of the encoded image data and, when the number of vertical pixels of the image data is indivisible by a number of vertical pixels corresponding to an encoding unit in encoding the image data, controlling the filter processing in performing the one or more filter processing such that data in a last row of the image data is copied and the copied data is added to the image data until the number of vertical pixels is divisible.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
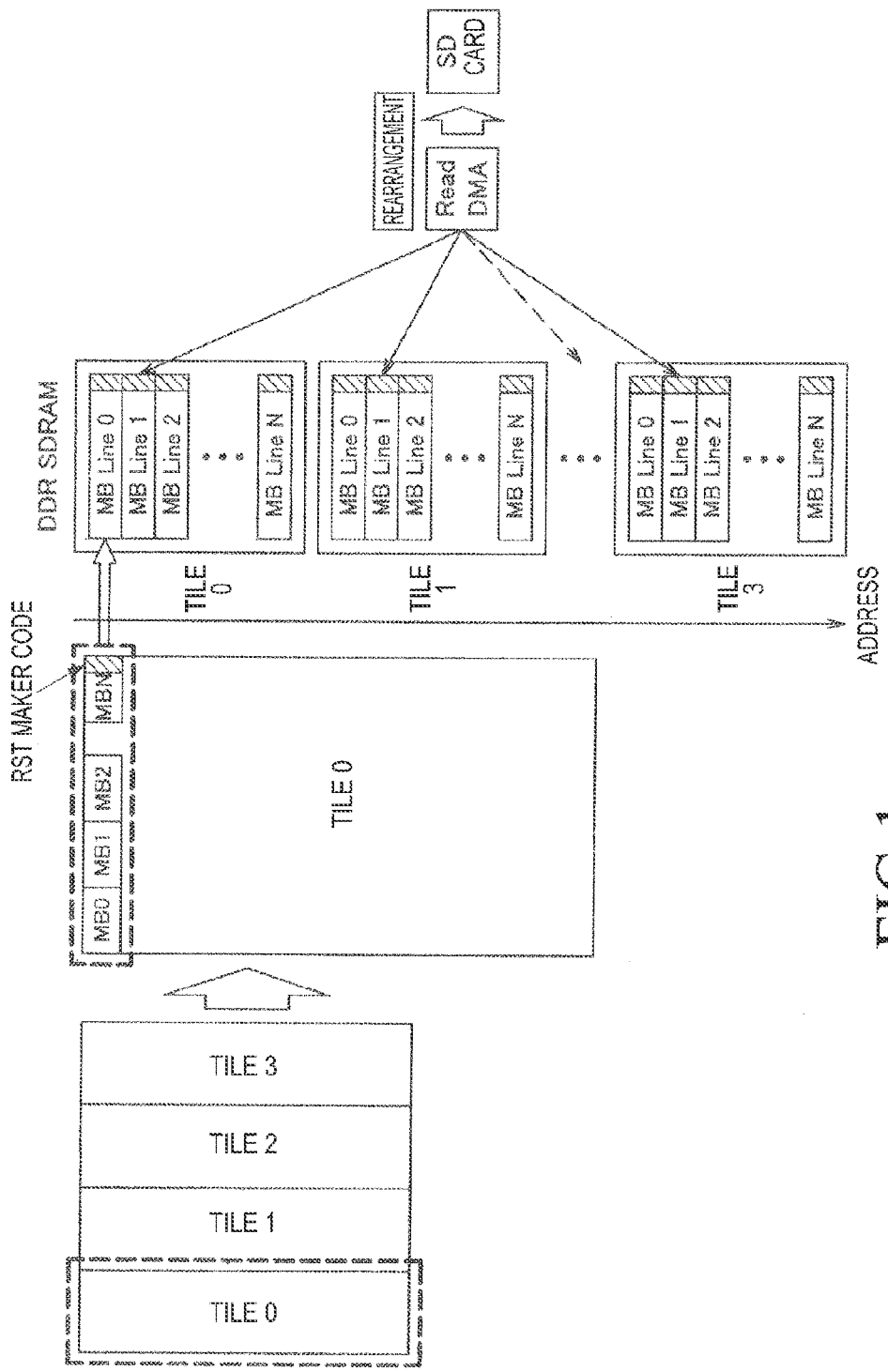
FIG. 1 illustrates JPEG compression encoding of a digital still camera according to the prior art.

Hereinafter, various embodiments of the present invention will be described with reference to the accompanying drawings. In the following description, the same elements will be designated by the same reference numerals although they are shown in different drawings.

1. Prior Art and Problems Associated Therewith

Prior to a detailed description of embodiments of the present invention, the prior art and problems thereof will be first described.

FIG. 1 is a view illustrating JPEG compression encoding of a digital still camera according to the prior art. In particular, FIG. 1 illustrates a configuration of a camera disclosed in Japanese Patent Publication No. 2007-267349 (hereinafter, referred to as "cited patent").

The cited patent discloses a method of vertically dividing one image and adding a Restart (RST) marker code to each of a plurality of vertically divided blocks in order to reduce access to an external memory in JPEG compression encoding.

JPEG compression encoding according to the prior art does not have to be performed for one entire image, but an encoding method of separating parts of the image by an RST marker code can be applied. In FIG. 1, compression encoding is performed by dividing one image into four blocks (tile 0, tile 1, tile 2, and tile 3) and then adding an RST marker code to a rightmost part of a Micro Controller Unit (MCU) line of each block. As described above, when one image is divided into a plurality of blocks in the prior art, encoding is performed by adding the RST marker code to an end of the MCU line included in each block.

However, when the encoding is performed according to the above method, a data capturing direction becomes a direction in the unit of blocks, so that the data capturing direction does not correspond to "tile 0→tile 1→tile 2→tile 3". Accordingly, in order to preserve image data after the encoding, it is necessary to arrange again the encoded data in an order of "an MCU line of an uppermost row of tile 0→ an MCU line of an uppermost row of tile 1→ . . . ".

Since a variable length encoding is used in JPEG encoding, code amounts are not consistent in every pixel or MCU, and an encoding unit does not correspond to the byte unit. However, since the RST marker code should be in a boundary of bytes, each of MCU columns becomes the byte unit, and accordingly, handling in an external memory becomes simple.

However, the method of performing compression by adding the RST marker code disclosed in the cited patent has the following problems.

First, when compression is performed by adding the RST marker code, encoding efficiency deteriorates. The JPEG compression encoding in a divided image processing system according to the cited patent is performed by taking a differential based on block information in a left side of the JPEG image and performing a Direct Current (DC) prediction by using the differential. When the image is divided into a plurality of blocks and the divided blocks are separated by the RST marker code, a configuration may be simple because a differential is reset in the unit of blocks. However, the number of RST marker codes corresponding to the division is required to be added and encoding efficiency deteriorates since the differential encoding cannot be used between blocks.

Figure 2:
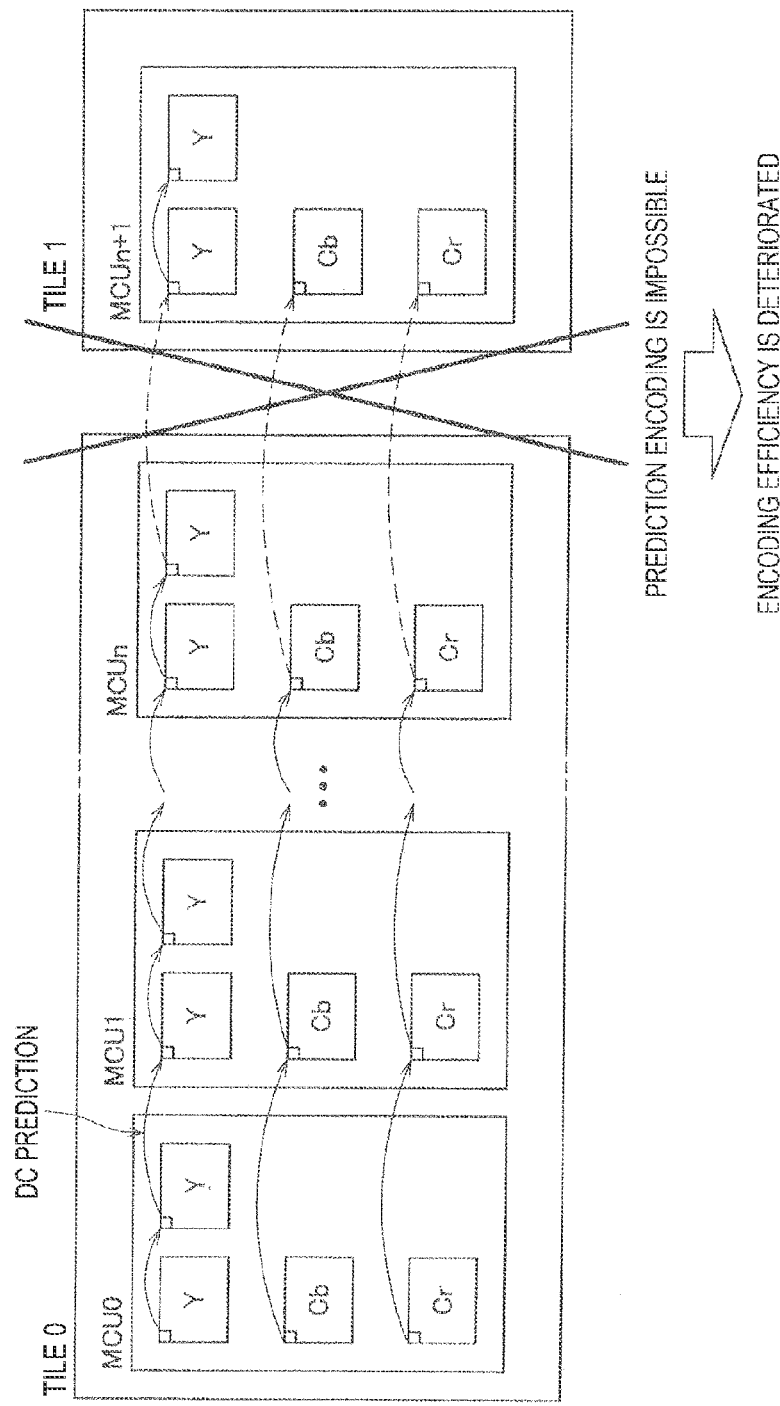
FIG. 2 illustrates a case where a differential encoding cannot be used between blocks according to the prior art.

FIG. 2 illustrates a case where differential encoding cannot be used between blocks according to the prior art. As illustrated in FIG. 2, encoding may be performed by performing a DC prediction between MCUs within the same block. However, since the differential encoding cannot be used between different blocks, encoding efficiency deteriorates in a part escaping from the corresponding block (tile 0→tile 1).

Next, in the compression performed by adding the RST marker code, there is a limitation in an image size. The image size between RST marker codes is required to be uniform. In general, since processing in the unit of horizontal 16 pixels as luminance components is performed in the digital still camera JPEG image, each block should be in the unit of 16 pixels. For example, when there is a configuration of vertically dividing four blocks, an image size can be changed in the unit of 64 pixels.

In general, while a block size becomes smaller, such as 256 horizontal pixels, 512 horizontal pixels and the like, an entire image becomes larger, up to 5000 to 8000 pixels. For this reason, when an image is processed after the image is divided into, for example, 32 blocks, an image size can be changed only in the unit of 256 pixels. However, such a suitable imaging apparatus is by no means common, and black data must be inserted into a right side of an indivisible part.

Figure 3:
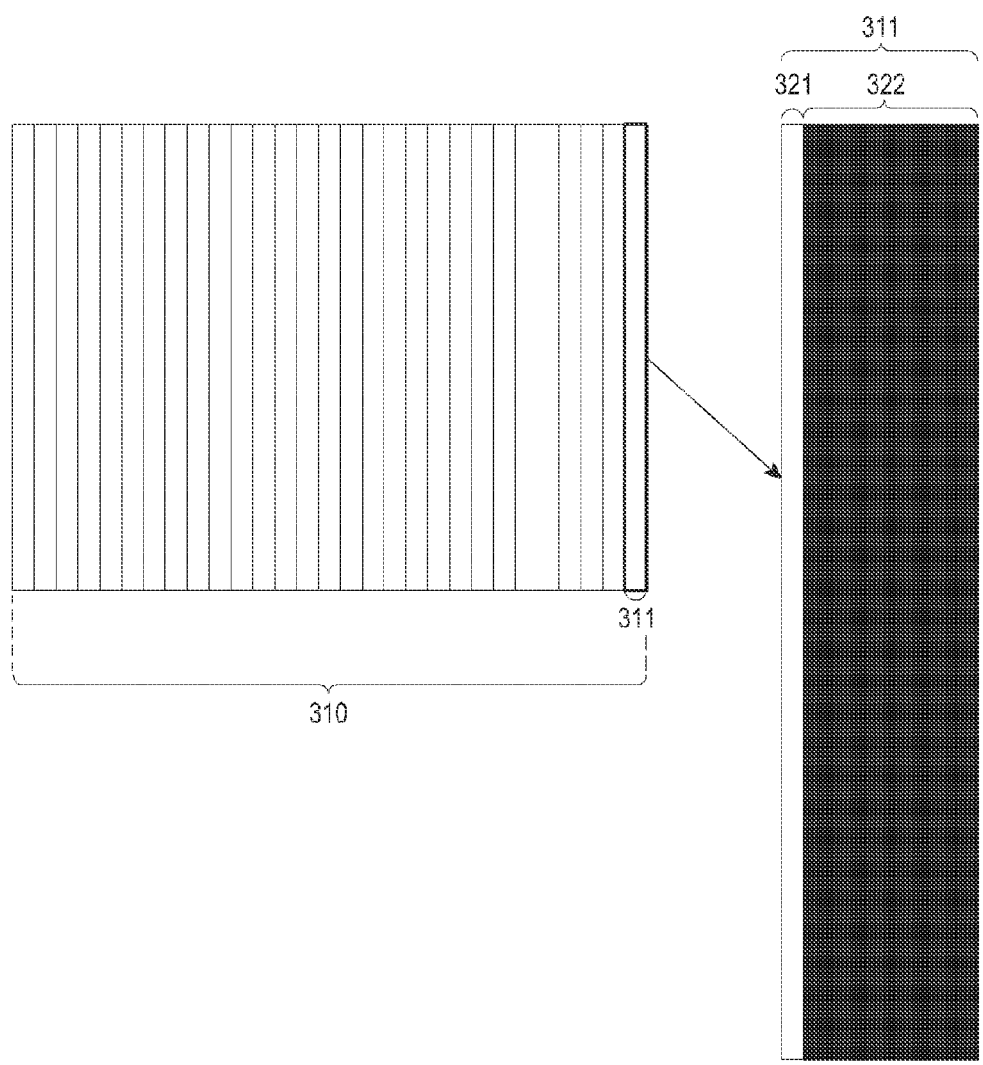
FIG. 3 illustrates image data according to the prior art.

FIG. 3 illustrates image data according to the prior art, and shows an image requiring an insertion of black data into a right side according to the prior art. A size of image data 310 illustrated in FIG. 3 is 7952 pixels in a horizontal direction, and a width of each block is 256 pixels. Accordingly, in a rightmost block 311 of the image data 310 illustrated in FIG. 3, only image data 321 having a width of 16 pixels is actual image data. Therefore, black data is inserted into the remaining image data 322 having a width of 240 pixels for processing as a block.

Accordingly, when JPEG compression encoding is performed by dividing image-processed image data into a plurality of blocks without passing through an external memory, the present invention provides an imaging apparatus which performs JPEG compression encoding while not limiting an image size of the plurality of blocks and not deteriorating an encoding efficiency, and also image data combination even after the compression, is easily performed.

2. Embodiments of the Present Invention

An example of a function configuration of a digital still camera is described below. First, a configuration of a digital still camera according to an embodiment of the present will be described.

Figure 4:
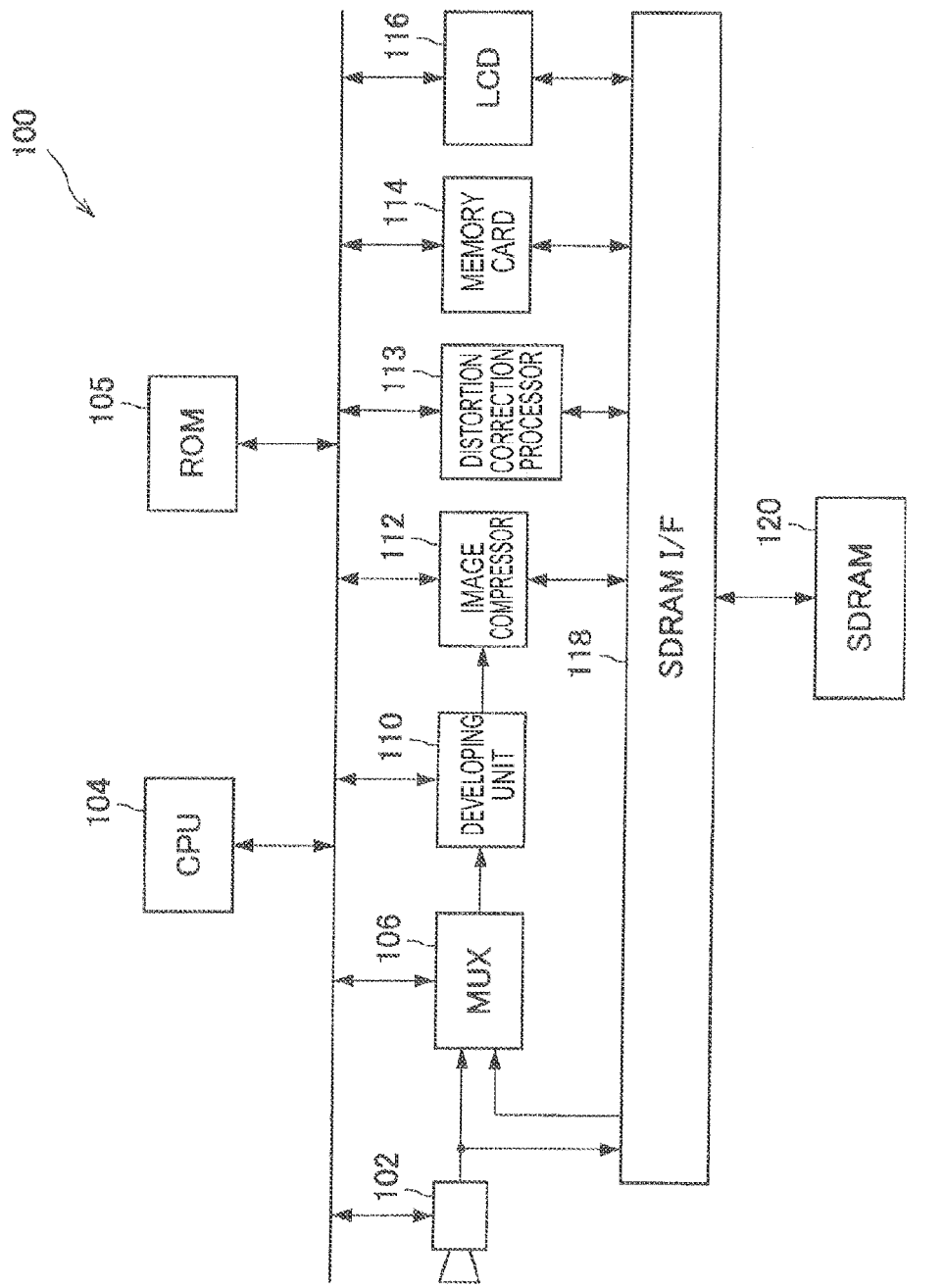
FIG. 4 is a block diagram illustrating a configuration of a digital still camera according to an embodiment of the present invention.

FIG. 4 is a block diagram illustrating a configuration of a digital still camera according to an embodiment of the present invention. Referring to FIG. 4, a digital still camera 100 includes a camera unit 102, a CPU 104, a ROM 105, a multiplexer (MUX) 106, a developing unit 110, an image compressor 112, a distortion correction processor 113, a memory card 114, an LCD 116, an SDRAM I/F 118, and an SDRAM 120.

Although not illustrated in FIG. 4, the camera unit 102 may include a zoom lens, a focus lens, an imaging apparatus to which color filters in a Bayer array are installed, and the like. The camera unit 102 provides a light from a subject to the imaging apparatus which converts the light to an electrical signal, and outputs red, green and blue (RGB) image data in the Bayer array from the imaging apparatus. Here, the imaging apparatus may be implemented by a Charge Coupled Device (CCD) image sensor or a Complementary Metal Oxide Semiconductor (CMOS) image sensor. The camera unit 102 generates RGB image data in the Bayer array. Further, the camera unit 102 transmits the generated RGB image data to the SDRAM 120 through the SDRAM I/F 118 or directly transmits the generated RGB image data to the multiplexer 106. Hereinafter, for convenience of the description, the RGB image data in the Bayer array output from the camera unit 102 will be referred to as "data".

The CPU 104 controls an operation of each component included in the digital still camera 100. Various programs or setting information used for controlling the operation of the digital still camera 100 are stored in the ROM 105. The data generated and output from the camera unit 102 and the image data stored in the SDRAM 120 are input into the multiplexer 106. The multiplexer 106 transmits the data or the image data to the developing unit 110.

The developing unit 110 generates the data generated in the camera unit 102, that is, the image data by using the light input into the imaging apparatus. The image data includes YCbCr information containing a luminance signal and a chromaticity signal, and the developing unit 110 performs a developing processing on the data to generate the image data. The image data generated by the developing unit 110 is transferred to the image compressor 112.

The image compressor 112 performs a predetermined image compression processing on the image data generated by the developing unit 110, and the image compressor 112 compresses the image data to JPEG. Under a control of the CPU 104, the image data compressed by the image compressor 112, that is, encoded image data, is transferred to the SDRAM 120 through the SDRAM I/F 118.

The distortion correction processor 113 simultaneously restrains power consumption and corrects a distortion of the encoded image data stored in the SDRAM 120 by controlling a supply of a clock provided to the SDRAM 120. In this way, the distortion of the encoded image data stored in the SDRAM 120 may be corrected by the distortion correction processor 113.

The memory card 114 stores the encoded image data compressed by the image compressor 112 and stored in the SDRAM 120. The encoded image data may be recorded in the memory card 114 under a control of the CPU 104.

The LCD 116 displays various setting screens of the digital still camera 100. Further, the LCD 116 may display the data generated by the camera unit 102 in real time (for example, in a live view type) or display the encoded image data stored in the memory card 114. Although the LCD 116 is used to display various data of the digital still camera 100 in the present embodiment, the various data of the digital still camera 100 may be displayed using another display device other than the LCD 116, for example, an organic Electro Luminescence (EL) display and the like in another embodiment of the present invention.

The SDRAM I/F 118 is an interface located between the SDRAM 120 and the above described components. When the SDRAM I/F 118 records data in the SDRAM 120 or reads the data from the SDRAM 120, the SDRAM I/F 118 mediates the recording or the reading. The SDRAM 120 temporarily stores the data (for example, image data) generated by the camera unit 102, the data developed by the developing unit 110, the image data (for example, encoded image data) compressed by the image compressor 112, and the like.

Although not illustrated in FIG. 4, the digital still camera 100 may further include an input unit for receiving an input control of the user according to another embodiment of the present invention. The input unit may include a shutter button for executing a photographing processing, a control button for controlling the digital still camera 100, and the like.

In the present embodiment, when the image data is generated by the developing unit 110, the image data is directly supplied to the image compressor 112, without passing through the SDARM 120. Since the image data is directly supplied to the image compressor 112 as described above, a time required from the photographing by the camera unit 102 to the compression by the image compressor 112 is reduced and thus a processing speed is faster. ROM 105 stores information and various programs for controlling the operation of the digital still camera 100.

In the above description, the configuration of the digital still camera 100 according to an embodiment of the present invention has been discussed with reference to FIG. 4. Hereinafter, a configuration of the developing unit 110 included in the digital still camera 100 according to an embodiment of the present invention will be described.

Figure 5:
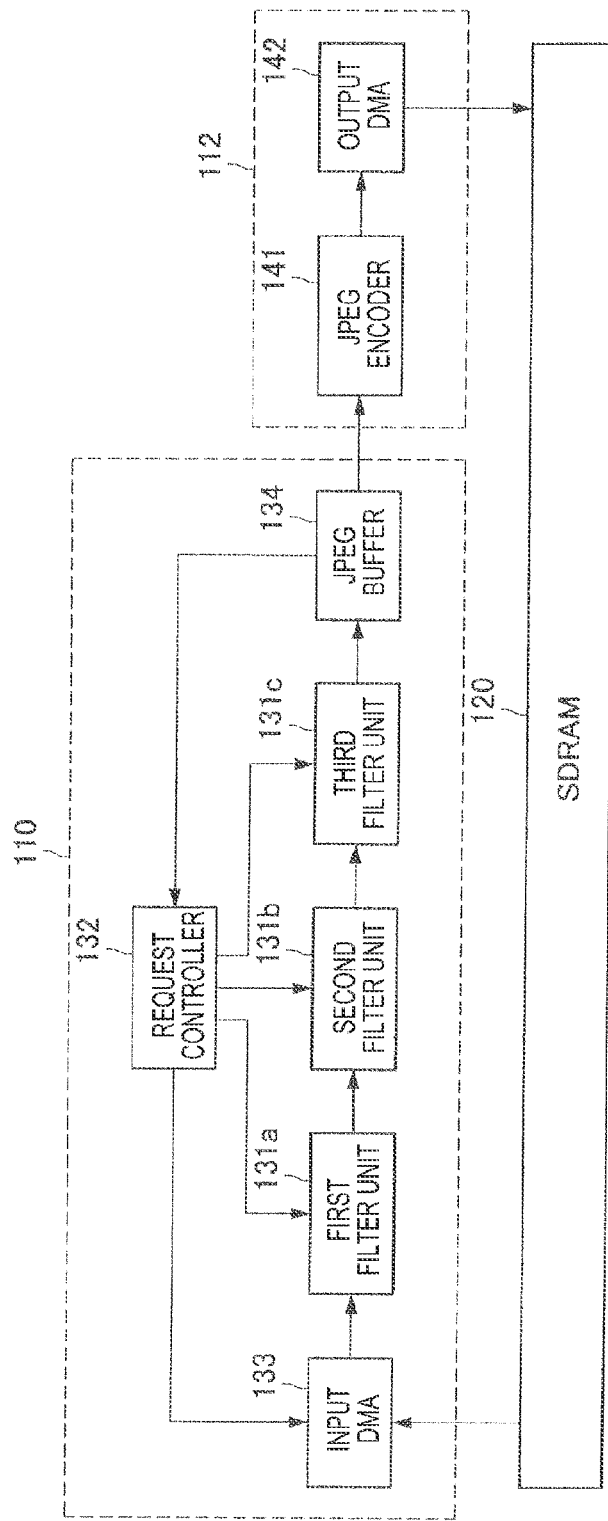
FIG. 5 is a block diagram illustrating a configuration of a developing unit included in a digital still camera according to an embodiment of the present invention.

FIG. 5 is a block diagram illustrating the configuration of the developing unit 110 included in the digital still camera 100 according to an embodiment of the present invention. As illustrated in FIG. 5, the developing unit 110 includes first to third filter units 131a, 131b, and 131c, and a request controller 132. Further, as illustrated in FIG. 5, the developing unit 110 further includes an input Direct Memory Access (DMA) 133 and a JPEG buffer 134. In addition, the image compressor 112 includes a JPEG encoder 141 and an output DMA 142.

Each of the first to third filter units 131a, 131b, and 131c performs filter processing on the data read from the SDRAM 120 by the input DMA 133. For example, the first filter unit 131a converts Bayer data to YUV data, the second filter unit 131b performs a noise reduction, and the third filter unit 131c performs a correction such as emphasizing an edge.

The request controller 132 controls timing when a line is input into the JPEG buffer 134 by observing the number of output lines of the JPEG buffer 134. As described above, by controlling the timing when the line is input into the JPEG buffer 134, the request controller 132 enables data to not be newly input into the JPEG buffer 134 until the JPEG buffer 134 completes the output. The request controller 132 controls timings when the input DMA 133 and the first to third filter units 131a, 131b, and 131c output the line, that is, a line output timing.

When the input DMA 133 receives a request from the request controller 132, the input DMA 133 reads the original image data stored in the SDRAM 120 one line at a time or a plurality of lines from a top to a bottom of the image data and outputs the read image data to the first filter unit 131a. Although three filter units 131a, 131b, and 131c are illustrated in the present embodiment as illustrated in FIG. 5, the number of filters is not limited in the present invention. The number of filters may be less than or equal to 2, or greater than or equal to 4.

Hereinafter, filter processing by the first to third filter units 131a, 131b, and 131c of the developing unit 100 included in the digital still camera 100 according to an embodiment of the present invention will be described.

In general, in order to enable the digital still camera to perform filter processing, a part which becomes a margin of the filter, that is, a ring pixel, is required. Data output from the filter is data in which the ring pixel part is removed. However, when the ring pixel is removed, the image data becomes smaller by the size of the ring pixel part. Particularly, as image quality of recent image data becomes high-definition, the number of filter taps increases and also the pixel number of ring pixels increases according to the increase in the number of filter taps.

Figure 6:
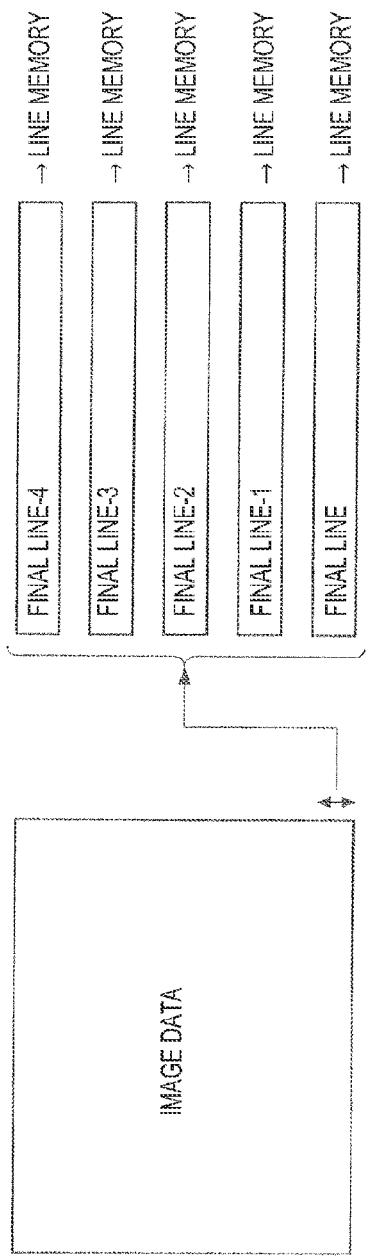
FIG. 6 illustrates a general filter processing of removing a ring pixel.

FIG. 6 illustrates a general filter processing of removing the ring pixel. FIG. 6 shows a state where image data is input into each of line memories corresponding to five final lines (a final line−4, a final line−3, a final line−2, a final line−1, and a final line) in a vertical direction of the image data. As described above, filter processing of the five final lines in the vertical direction of the image data is performed by inputting the image data of the final line−4 to the final line into the line memories. Further, when the image data is input into the line memories from the final line−4 to the final line, the filter processing operation ends.

At this time, the first to third filter units 131a, 131b, and 131c of the digital still camera 100 according to an embodiment of the present invention may not perform the general operation of removing the ring pixel as described above. The first to third filter units 131a, 131b, and 131c according to the present embodiment perform filter processing (ringless processing) for the image data by outputting the image data having the same size as that of the input image data. The ringless processing may be performed by all of the first to third filter units 131a, 131b, and 131c, or may be performed by only the third filter unit 131c which is the last end, according to another embodiment of the present invention.

Figure 7:
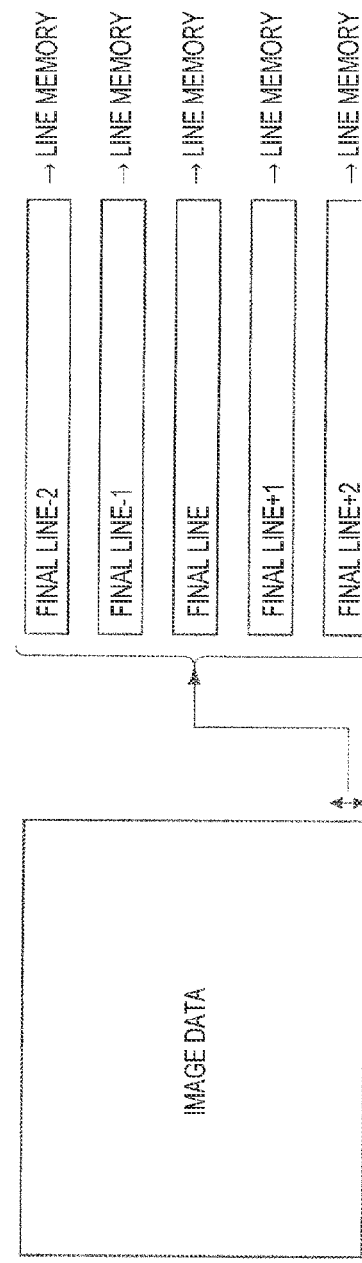
FIG. 7 illustrates a filter processing by first to third filter units of a developing unit included in a digital still camera according to an embodiment of the present invention.

FIG. 7 illustrates filter processing by the first to third filter units 131a, 131b, and 131c of the developing unit 110 included in the digital still camera 100 according to an embodiment of the present invention. Similar to FIG. 6, FIG. 7 also shows processing for the five final lines in the vertical direction of the image data. Unlike FIG. 6, in FIG. 7, the first to third filter units 131a, 131b, and 131c of the digital still camera 100 according to the present embodiment input the three final lines a final line−2, a final line−1, and a final line) to the line memories. Further, the first to third filter units 131a, 131b, and 131c input the remaining two lines (an additional line+1 and an additional line+2) copied from the final line to the line memories. As described above, as the image data is input into the line memories, the filter processing of outputting the image data having the same size as that of the input image can be performed without removing the ring pixel.

In the present embodiment, the first filter unit 131a converts Bayer data to YUV data, the second filter unit 131b performs noise reduction, and the third filter unit 131c performs edge emphasis correction and the like.

The first to third filters 131a, 131b, and 131c according to the present embodiment are directly connected in series, and data output from each of the first to third filter units 131a, 131b, and 131c are directly input into a filter for later processing. Further, each of the first to third filters 131a, 131b, and 131c performs a processing of configuring one pixel based on a plurality of pixels. When the processing for the input image is performed, a ring pixel may be added to the input line in each of the first to third filters 131a, 131b, and 131c in order to prevent the pixels from being reduced.

More specifically, when the JPEG buffer 134 outputs a number of lines that is less than the number of input lines, the request controller 132 may not particularly control the first to third filter units 131a, 131b, and 131c. Accordingly, the first to third filter units 131a, 131b, and 131c continuously input the lines since there is no waiting input into the JPEG buffer 134, and the first to third filter units 131a, 131b, and 131c detect that there is no input line and input a ring line in a lower part into a next filter or the JPEG buffer 134.

When the JPEG buffer 134 outputs one or more lines for one line input, the request controller 132 controls the reading of the line by the input DMA 133 and the line output timing in the input DMA 133 until all lines of the original image data stored in the SDRAM 120 are output.

Specifically, when the request controller 132 identifies that the JPEG buffer 134 completes the output, the request controller 132 makes a request for reading a next line by the input DMA 133. Thereafter, the request controller 132 makes a request for outputting a ring line in each lower part in an order of the first, second, and third filter units 131a, 131b, and 131c, by the first to third filter units 131a, 131b, and 131c so that the ring line in each lower part is input into the JPEG buffer 134 along a ring pixel edge added by each of the first to third filter units 131a, 131b, and 131c.

The request of the request controller 132 may be determined according to the following order. At this time, it is assumed that the number of input lines that divide the original image data is A, the number of output lines output from the third filter unit 131c up to now is B, and the numbers of ring lines in the lower parts of the first to third filter units 131a, 131b, and 131c are L1, L2, and L3, respectively. When, "A-(L1+L2+L3)≤B<A-(L2+L3)", it is assumed that B corresponds to the a number of output lines between "'A-(L1+L2+L3)" and "A-(L2+L3)". When the above condition is satisfied, the request controller 132 makes a request for sequentially outputting the ring lines in the lower part from a top to a bottom by the first filter unit 131a.

Next, when "A-(L2+L3)≤B<A-L3", that is, when B corresponds to a number of output lines between "A-(L2+L3)" and "A-L3", the request controller 132 makes a request for sequentially outputting the ring lines in the lower part of the second filter unit 131b from a top.

Finally, when "A-L3≤B<A", that is, when B corresponds to a number of output lines between "A-L3" and "A", the request controller 132 makes a request for sequentially outputting the ring lines in the lower part of the third filter unit 131c from a top.

According to the embodiment of the present invention, it will be apparent to those skilled in the art that filter processing by the first to third filter units 131a, 131b, and 131c is not limited thereto.

Since the encoding into JPEG performed by the image compressor 112 is an encoding based on DCT, the encoding may be performed only in units of eight vertical pixels. However, image processing in the developing unit 110 does not output a size greater than or equal to the Bayer size. Accordingly, for example, when the number of vertical lines is 100, the last part lacks four lines. According to the prior art, when the lowest part does not completely include eight pixels in encoding the image data in units of eight vertical pixels, the last line is copied or black data is added to a row which does not completely include eight lines.

Since the digital still camera 100 according to an embodiment of the present invention supplies the image data image-processed by the developing unit 110 to the image compressor 112 without passing through the SDRAM 120, the number of vertical pixels in a JPEG image may be recognized by the image compressor 112 (or the JPEG buffer 134). Accordingly, the image compressor 112 or the JPEG buffer 134 can perform the output processing for the first to third filter units 131a, 131b, and 131c. In FIG. 5, the JPEG buffer 134 instructs the request controller 132 to perform the output processing for the first to third filter units 131a, 131b, and 131c.

Specifically, the digital still camera 100 according to an embodiment of the present invention performs the following processes:

(1) A Case Where a Frame is Valid

A general filter processing operation is performed in this case. The JPEG buffer 134 performs an operation corresponding to the request for the lines from the request controller 132.

(2) A Case Where a Frame is Invalid

When a line counter included in the first to third filter units 131a, 131b, and 131c starts operating during a valid period of the frame, the request controller 132 issues a request for ringless processing to the first to third filter units 131a, 131b, and 131c until the number of lines becomes a multiple of eight and completes the ringless processing operation at a time when the number of lines becomes the multiple of eight. As described above, since the first to third filter units 131a, 131b, and 131c perform the ringless processing, the developing unit 110 can output an image data which has no great difference from the input image.

Figure 8:
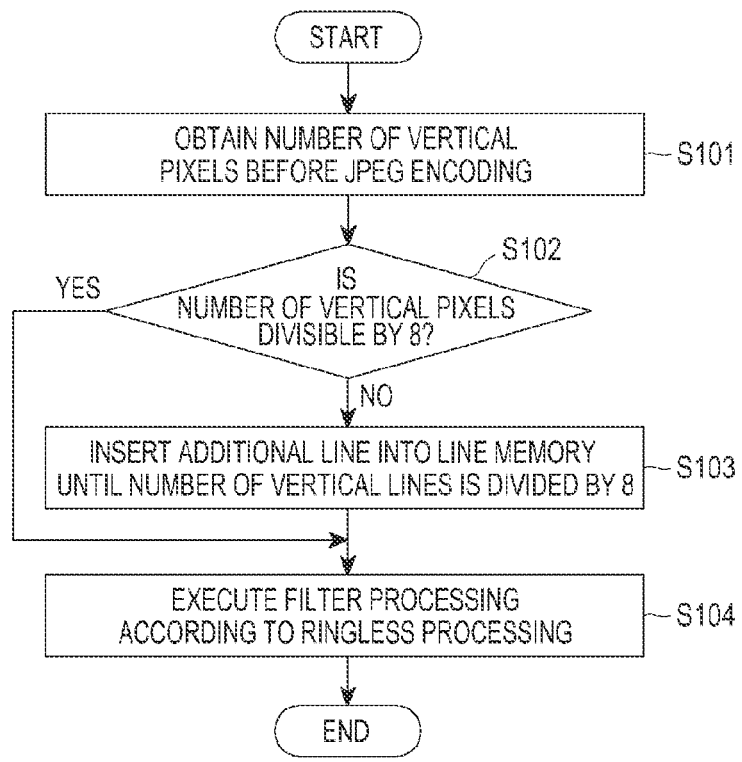
FIG. 8 is a flowchart illustrating an operation of a digital still camera according to an embodiment of the present invention.

FIG. 8 is a flowchart illustrating an operation of the digital still camera according to an embodiment of the present invention. The flowchart illustrated in FIG. 8 shows the filter processing of the developing unit 110 in the digital still camera 100. The JPEG buffer 134 acquires the number of vertical lines before JPEG encoding in step S101. The JPEG buffer 134 transfers information on the number of vertical lines acquired in step S101 to the request controller 132.

When the information on the number of vertical lines before JPEG encoding is transferred from the JPEG buffer 134, the request controller 132 determines whether the number of vertical lines is divisible by eight which is the number of vertical pixels of MCU in step S102.

As a result of the determination in step S102, when the number of vertical lines before JPEG encoding corresponds to the number of lines which cannot be divided by eight, the request controller 132 makes a request for adding additional lines to the line memories by the first to third filter units 131a, 131b, and 131c until the number of vertical lines can be divided by eight, that is, adding the lines after a final line until the number of vertical lines including the added lines (additional lines) can be divided by eight in step S103.

As a result of the determination in step S102, when the number of vertical lines before the JPEG encoding can be divided by eight, the request controller 132 makes a request for inserting the final line into the line memory by the first to third filter units 131a, 131b, and 131c. Further, when the request controller 132 makes a request for adding the additional lines by the first to third filter units 131a, 131b, and 131c in step S103, the first to third filter units 131a, 131b, and 131c and the input DMA 133 perform the filter processing for the data read from the SDRAM 120. That is, the filter processing is performed according to the ringless processing in step S104.

Figure 9:
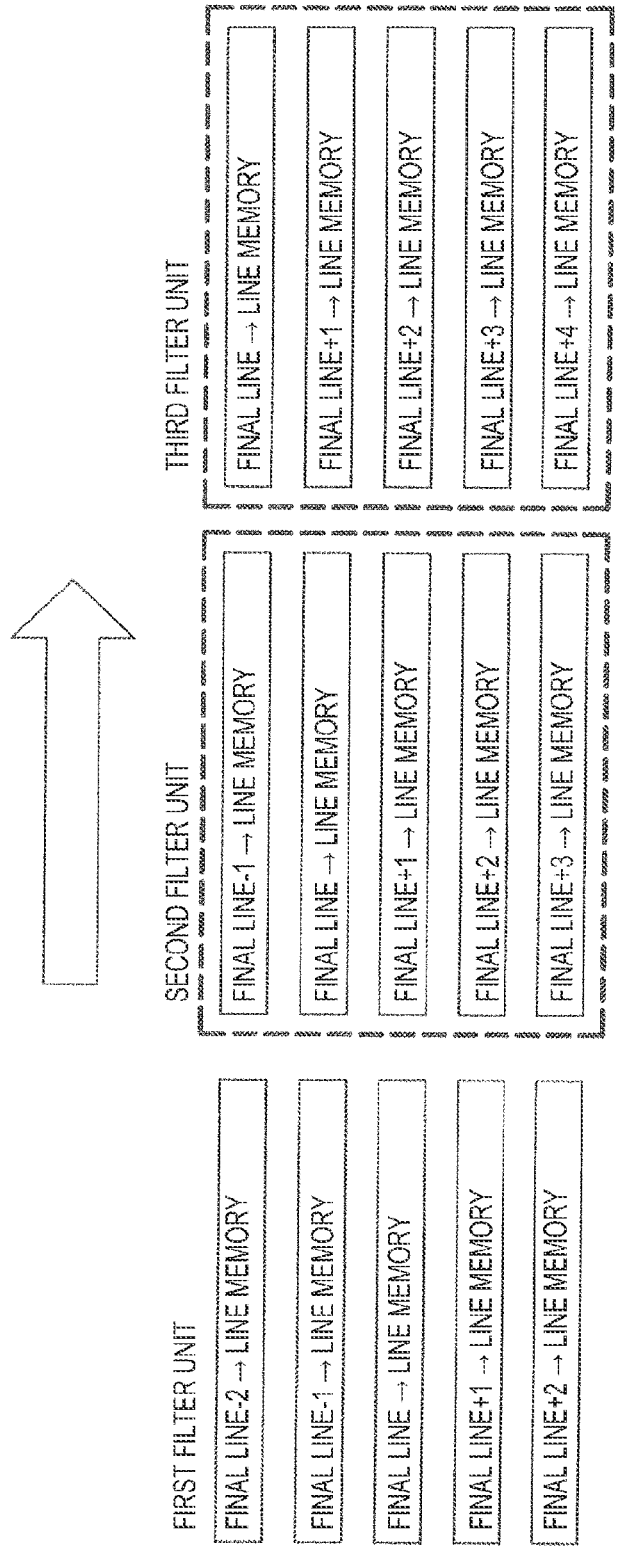
FIG. 9 illustrates a filter processing by first to third filter units of a developing unit included in a digital still camera according to an embodiment of the present invention.

FIG. 9 illustrates filter processing by the first to third filter units 131a, 131b, and 131c of the developing unit 110 included in the digital still camera 100 according to an embodiment of the present invention. FIG. 9 shows processing for five final lines in a vertical direction of the image data as illustrated in FIGS. 6 and 7.

First, the first filter unit 131a inputs data of three final lines (a final line−2, a final line−1, and a final line) into line memories and inputs data of the remaining two lines (an additional line+1 and an additional line+2) copied from the final line into line memories, and then the data is output. Continuously, the second filter unit 131b inputs data of two final lines (a final line−1 and a final line) into the line memories and inputs data of the remaining three lines (an additional line+1, an additional line+2, and an additional line+3) copied from the final line into the line memory, and then the data is output. Finally, the third filter unit 131c inputs data of the final line into the line memory and inputs the remaining four lines (an additional line+1, an additional line+2, and an additional line+3, and an additional line+4) copied from the final line into the line memories, and then the data is output.

As described above, filter processing according to the present invention corresponds to sequentially inputting the data of the final lines into the line memories. The filter processing according to the present invention improves an image quality of the lower part of the image data and accordingly, obtains more natural image data in comparison with the JPEG encoding method in which the filter processing according to the prior art is performed by copying the final line or adding black data to a row which does not completely include eight lines.

Figure 10:
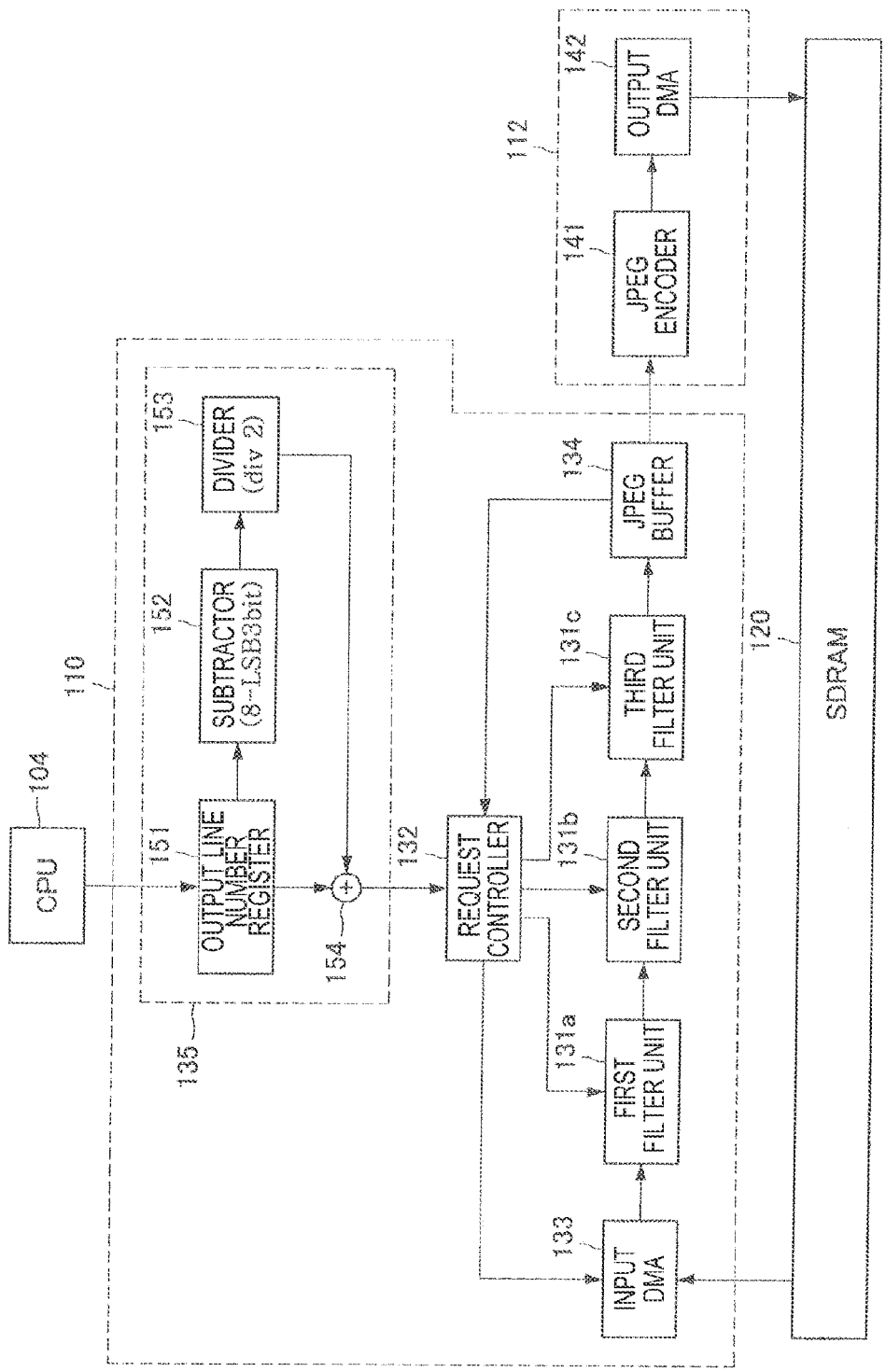
FIG. 10 is a block diagram illustrating a configuration of a digital still camera including a developing unit according to another embodiment of the present invention.

FIG. 10 is a block diagram illustrating a configuration of the digital still camera including the developing unit according to another embodiment of the present invention. As illustrated in FIG. 10, the developing unit 110 included in the digital still camera 100 according to another embodiment of the present invention includes the first to third filter units 131a, 131b, and 131c, the request controller 132, and a calculator 135. In FIG. 10, the developing unit 110 further includes the input DMA 133 and the JPEG buffer 134. The image compressor 112 includes the JPEG encoder 141 and the output DMA 142.

The calculator 135 includes an output line number register 151, a subtractor 152, a divider 153, and an adder 154. The output line number register 151 records the number of vertical lines of the encoded image data after the JPEG encoding. The subtractor 152 subtracts the number of output lines recorded in the output line number register 151 by eight corresponding to the number of vertical pixels of one MCU. The divider 153 divides a subtraction result of the subtractor 152 by two. The adder 154 adds the number of output lines recorded in the output line number register 151 and a division result by the divider 153 and then outputs an addition result to the request controller 132.

Since the number of vertical lines of the encoded image data after the JPEG encoding can be recognized in advance when the number of vertical lines is set, the CPU 104 can record the number of output lines in the output line number register 151. The subtractor 152 subtracts LSB 3 bits for the number of output lines recorded in the output line number register 151 from eight corresponding to the number of vertical pixels of one MCU, and transfers a subtraction result to the divider 153. The divider 153 divides the subtraction result of the subtractor 152 by two. Further, the adder 154 adds the number of output lines recorded in the output line number register 151 and a division result of the divider 153, and outputs an addition result to the request controller 132 as the number of output lines.

As described above, when the calculator 135 calculates the number of output lines and outputs the calculated number of output lines to the request controller 132, the first to third filter units 131*a*, 131*b*, and 131*c* processes the calculation for a row which does not completely include eight lines divisibly in an upper part and a lower part of the screen, and accordingly, the JPEG encoding according to the present embodiment obtains a more natural image.

For example, when it is assumed that the calculator 135 outputs four as a result generated by dividing the number of vertical lines of the encoded image data after the JPEG encoding by eight, the request controller 132 first issues a request for two extra lines. Thereafter, when the filter processing for the image is performed by the first to third filter units 131*a*, 131*b*, and 131*c*, the first to third filter units 131*a*, 131*b*, and 131*c* may add data copied from the final line to the line memory for two lines in the lowest part. As described, by performing the filter processing divisibly in the upper part and the lower part of the screen, it is possible to obtain a more natural image in comparison with performing only JPEG encoding.

As described above, in the digital still camera 100 according to an embodiment of the present invention, the developing unit 110 generates image data including YCbCr information containing a luminance signal and a chromaticity signal, the image data is supplied to the image compressor 112 without passing through the SDRAM 120, and the developing unit 110 divides one image into a plurality of tiles and supplies the tiles to the image compressor 112. The image compressor 112 performs variable length-encoding for the image data in units of tiles.

Further, although the developing unit 110 of the digital still camera 100 according to an embodiment of the present invention executes the filter processing according to ringless processing, JPEG encoding is executed only in units of eight vertical lines since JPEG encoding is performed in units of MCUs. Accordingly, when the developing unit 110 according to the present invention performs filter processing using the first to third filter units 131*a*, 131*b*, and 131*c*, the developing unit 110 performs filter processing by adding a line copied from the final line to the line memory for a part which does not completely include eight lines. Therefore, the digital still camera 100 obtains a more natural image after JPEG encoding is performed.

As described above, according to the present invention, an imaging apparatus and an image processing method are provided which can efficiently perform JPEG compression encoding by dividing an image after image processing without passing through an external memory into a plurality of blocks and generate a natural compressed image.

Although various embodiments of the present invention have been described in detail with reference to the accompanying drawings, the present invention is not limited thereto. While the present invention has been shown and described with reference to certain embodiments thereof, it will be understood by those skilled in the art that various changes in form and details may be made therein without departing from the spirit and scope of the present invention as defined by the appended claims.

What is claimed is:

1. An imaging apparatus comprising:
an image processor for generating image data from a light input into an imaging device;
an encoder for encoding the image data to generate encoded image data; and
a storage unit for storing the encoded image data,
wherein the image processor horizontally divides the image data into a plurality of blocks and supplies the divided blocks to the encoder, and includes one or more filter units for performing a predetermined filter processing for the image data and a filter controller for controlling the filter processing of the filter unit,
wherein the filter controller acquires a number of vertical pixels of the image data, and controls the one or more filter units such that when the number of vertical pixels of the image data is indivisible by a number of vertical pixels corresponding to a preset encoding unit, data in a last row of the image data is copied and the copied data is added to the image data until the number of vertical pixels of the image data is divisible.

2. The imaging apparatus of claim 1, wherein the predetermined filter processing performed by the one or more filter unit makes a number of pixels of input data equal to a number of pixels of output data.

3. The imaging apparatus of claim 1, wherein the image processor includes two or more filter units dependently connected to each other, and a last end filter unit of the two or more filter units performs a filter processing that makes a number of pixels of input data equal to a number of pixels of output data.

4. The imaging apparatus of claim 1, wherein the image processor calculates a number of vertical pixels of the encoded image data, and when the number of vertical pixels of the encoded image data is not divisible by the number of vertical pixels corresponding to the preset encoding unit, the image processor generates the encoded image data by assigning the insufficient number of pixels from the encoding unit to a top and a bottom of the image data.

5. An image processing method comprising:
performing image processing by generating image data from light input into an imaging device;
encoding the image data to generate encoded image data; and
storing the encoded image data,
wherein when the image data is horizontally divided into a plurality of blocks during image processing, the image data is encoded without passing through storing the encoded image data,
wherein performing the image processing includes performing filter processing by one or more filters by performing a predetermined filter processing for the image data and performing a filter control by controlling the filter processing the one or more filters, and
performing the filter control includes calculating a number of vertical pixels of the encoded image data and, when the number of vertical pixels of the image data is indivisible by a number of vertical pixels corresponding to an encoding unit in encoding the image data, controlling the filter processing such that data in a last row of the image data is copied and the copied data is added to the image data until the number of vertical pixels is divisible.

* * * * *